United States Patent [19]
Ogino et al.

[11] Patent Number: 5,592,238
[45] Date of Patent: Jan. 7, 1997

[54] FIELD-SEQUENTIAL PROJECTION DISPLAY

[75] Inventors: Masanori Ogino, Yokohama; Tetsuo Asano, Mobara; Yasuhiko Uehara, Chiba, all of Japan

[73] Assignee: Hitachi, Ltd., Tokyo, Japan

[21] Appl. No.: 453,415

[22] Filed: May 30, 1995

[30] Foreign Application Priority Data

Oct. 27, 1994 [JP] Japan .................... 6-263437

[51] Int. Cl.⁶ .................. H04N 5/14; H04N 9/31; H04N 9/14
[52] U.S. Cl. .................. 348/744; 348/809; 348/776; 348/780
[58] Field of Search .................. 348/778, 744, 348/758, 760, 776, 729, 280, 782, 810, 809; H04N 9/31, 5/74, 9/16, 9/18

[56] References Cited

U.S. PATENT DOCUMENTS

| | | | |
|---|---|---|---|
| 4,056,827 | 11/1977 | Spooner et al. | 348/36 |
| 4,305,092 | 12/1981 | Katzfey | 348/776 |
| 5,373,347 | 12/1994 | Shaklee et al. | 348/778 |
| 5,442,411 | 8/1995 | Urbanus | 348/771 |

*Primary Examiner*—Glenton B. Burgess
*Attorney, Agent, or Firm*—Kenyon & Kenyon

[57] ABSTRACT

A single-tube type projection display with high light efficiency includes phosphors of three primary colors formed on upper, middle and lower portions of a faceplate of a CRT. Images of three colors are projected on the phosphor layers, and a color picture is obtained by overlapping the three color images on the screen by the projection lenses.

9 Claims, 5 Drawing Sheets

5,592,238

FIELD-SEQUENTIAL PROJECTION DISPLAY

BACKGROUND OF THE INVENTION

The present invention relates to a projection display of a single-tube type CRT having excellent light utilization efficiency.

Recent CRT type projection displays typically adopt the composition shown in FIG. 1. In FIG. 1, the CRT type projection display includes a screen 1, projection lenses 2, CRTs 3 of three primary colors arranged in the crosswise direction, a deflection yokes 4 (hereafter referred to as DY), convergence yokes 5 (hereafter referred to as CY), focus yokes 6 (hereafter referred to as FY), and cathode electrodes 7. This display of the conventional system is suitable for projecting a large picture but requires three CRTs. Accordingly, the conventional display also requires circuits to drive the DY, CY, FY and the cathode electrode. In other words, the conventional display, has disadvantages of requiring a great number of parts and a high cost.

Since the crossing angle (in FIG. 1) of the projected beams of three primary colors is large (about ten degrees in a diagonal 40-inch display), there has been another disadvantage that white appears colored depending on the direction in which one looks at the screen.

There have been some cases where a single-tube CRT for the three primary colors is used to produce a color picture, then enlarge and project the picture, but this method has a disadvantage that the light utilization efficiency is reduced by the shadow mask to less than about ⅓.

SUMMARY OF THE INVENTION

The present invention provides a projection display which can be formed by a smaller number of parts than in the conventional three-tube CRT type projection display and which is excellent in light utilization efficiency.

The present invention also relates to a projection display which can reduce the crossing angle of the projected beams of the three primary colors and, therefore, produce improved picture quality with a reduced color shift.

The present invention also provides a projection display which can reduce an emission timing error due to the difference in after-glow duration of phosphors. The display of the present invention includes a vertically-arranged three-primary-color phosphor CRT, a deflection yoke DY, a convergence yoke CY, a focus yoke FY, a cathode electrode, and an output circuit to drive the yokes and the electrode.

By horizontally and vertically scanning the vertically-arranged three-primary-color phosphor CRT with one electron beam, images of three primaries R, G and B are formed in a field sequential manner on the CRT. Those images are projected onto the screen by three projection lenses. The mutual spacing between the projection lenses can be reduced to half the spacing required in the prior art. Accordingly, the crossing angle can be decreased and, thus, the color shift can be decreased. Because the projection display according to the present invention requires only one each of the DY, CY, FY and the cathode electrode, and one drive circuit for each of those yokes and the electrode, the number of required parts to be installed can be reduced.

DETAILED DESCRIPTION OF THE PREFERRED EMBODIMENTS

Figure 2:
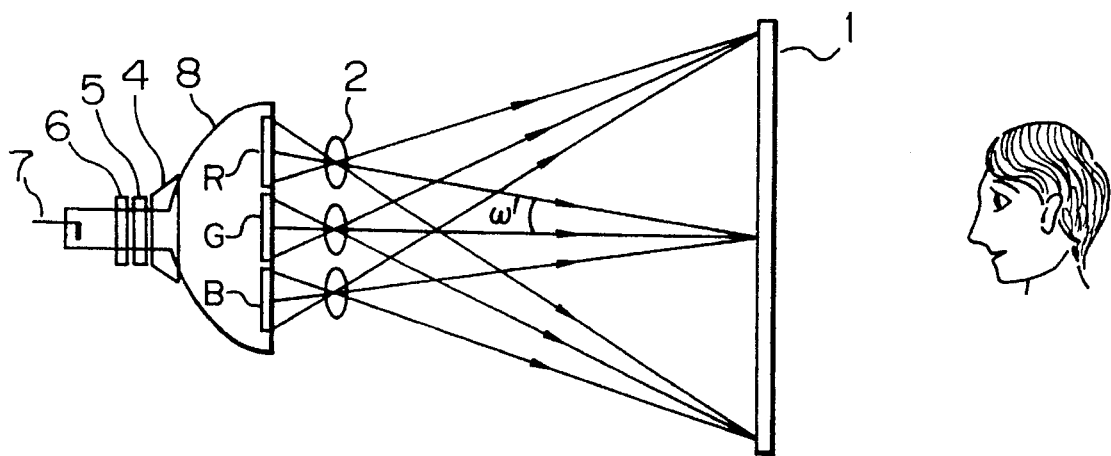
FIG. 2 is a schematic side view of the single-tube type projection display according to an embodiment of the present invention.

FIG. 2 shows a first embodiment of the present invention. FIG. 2 is shown in a vertical section, but not in a horizontal section.

Figure 1:
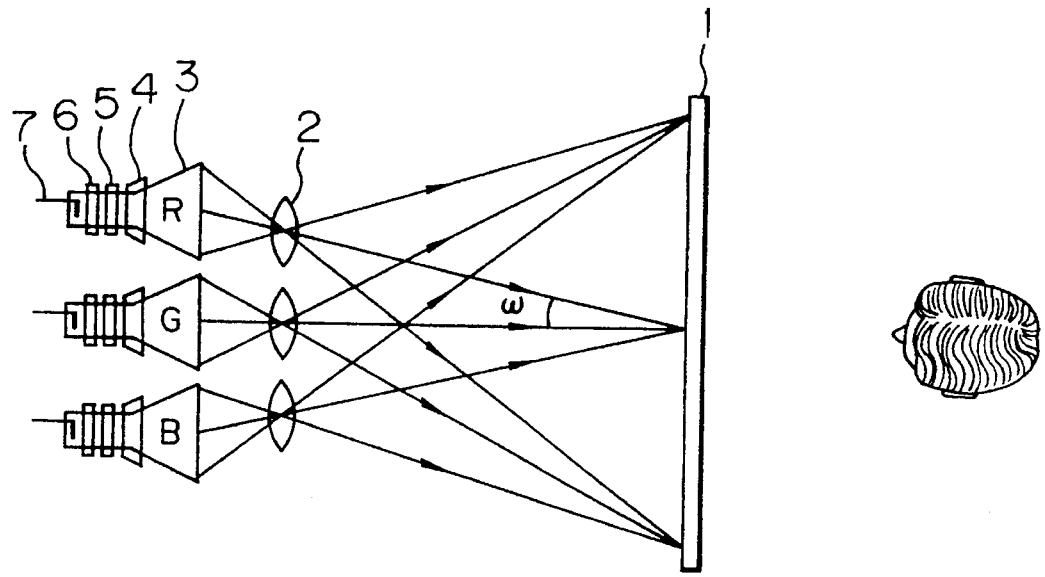
FIG. 1 is a schematic plan view of a conventional three-tube type projection display.

In FIG. 2, the display includes a vertically-arranged three-primary-color phosphor CRT. The value of the crossing angle $\omega'$ in FIG. 2 is about a half of $\omega$ in FIG. 1 when the projection distance is constant. In FIG. 2, the parts designated by R, G and B are the primary color phosphor layers.

Figure 3:
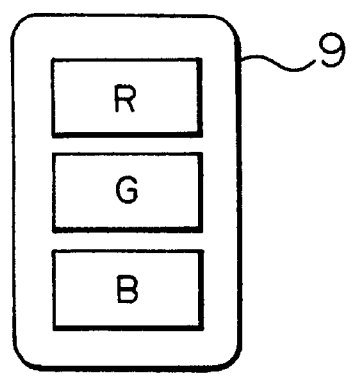
FIG. 3 is a front view of the vertically-arranged three-primary-color phosphor CRT according to an embodiment of the present invention.

FIG. 3 is a schematic front view of the CRT 8. Reference numeral 9 denotes the external appearance of the faceplate, and R, G and B denote the phosphor layers.

Figure 4:
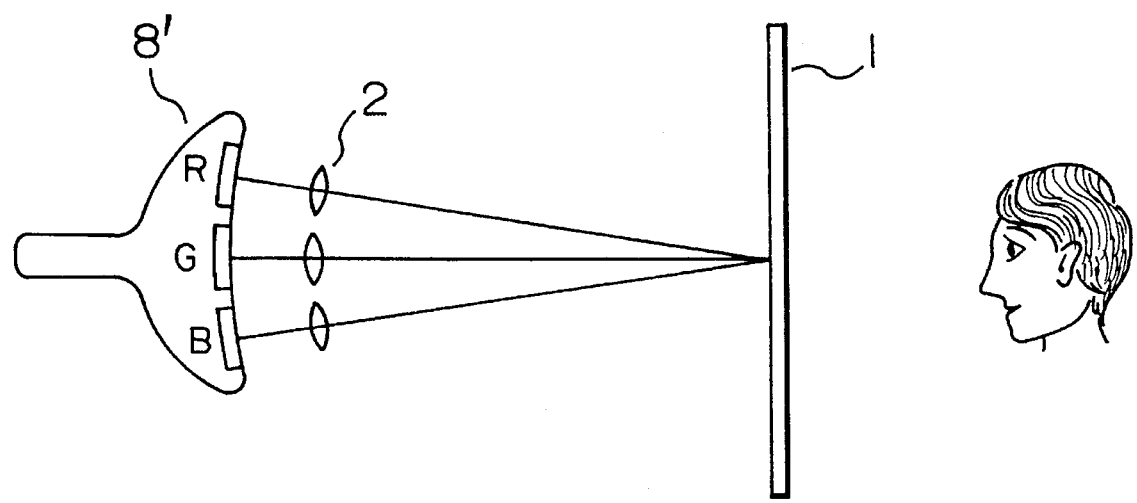
FIG. 4 is a schematic plan view showing a modification of an embodiment of the present invention.

FIG. 4 shows a modification of the above embodiment. Reference numeral 8 denotes a modified CRT in which the phosphor face is formed in a spherical shape with its center substantially corresponding to the center of the screen 1. The radius of its curvature is one to two times the distance from the screen. By this configuration, the design and the composition of the projection lenses 2 can be simplified.

The matters for attention in putting the present invention into practical application are as follows.

(1) The deflection angle of the vertical deflection circuit needs to be increased to about three times that in the prior art.

This can be realized easily by a little increase in electric power use. The reason is that the vertical scanning frequency is a low frequency, namely, less than one several hundredths of the horizontal scanning frequency.

(2) The deflection angle of the horizontal deflection circuit is equivalent to that in the prior art. However, it is necessary to increase the horizontal deflection frequency to about three times higher. For example, in ordinary television applications, the horizontal deflection frequency needs to be increased from about 16 kHz to about 48 kHz. However, this can be realized easily because the horizontal frequency of about 90 kHz has already been used in a direct viewing type computer display in commercial use.

(3) In projection displays of late, the so-called optical coupling structure has been used, in which the space between the face glass and the projection lenses in the CRT is filled with a liquid. In the prior art, it has been necessary to use three optical coupling structures, that is, one for each CRT. In the present invention, however, the optical coupling is integrated in a single structure.

(4) In the video frequency amplifier to drive the cathode electrode, it is necessary to convert the three primary color transmission signal into a three-primary-color-serial signal. Such a conversion process can be realized by a so-called scan-conversion circuit which uses semiconductor memory elements.

Figure 5:
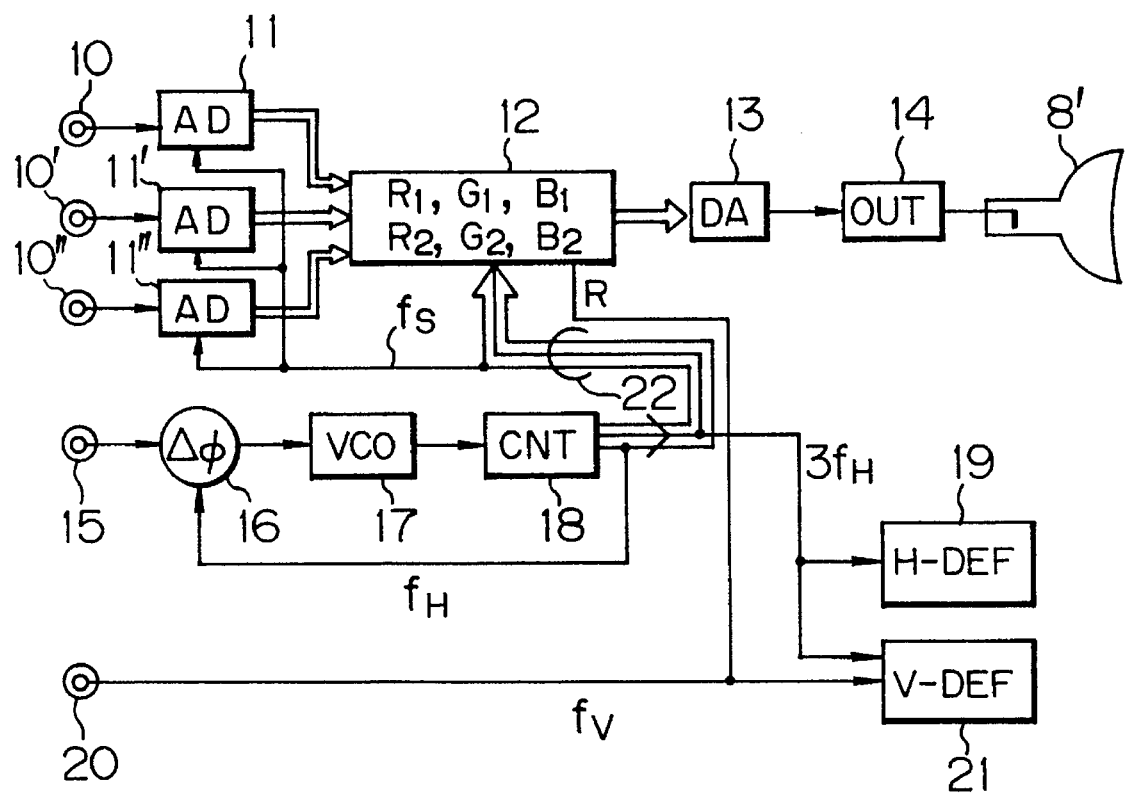
FIG. 5 is a block circuit diagram showing an embodiment of present invention.

FIG. 5 shows the detailed composition of the electric circuit of the single-tube type projection display according to an embodiment of the present invention. Reference numerals 10, 10' and 10" denote three primary-color-image signal input terminals, 11, 11' and 11" denotes AD converters, 12 denotes parallel-to-serial scan-conversion means using semiconductor memory elements, 13 denotes a converter, 14 denotes an image signal output amplifier, 8' denotes the above-mentioned CRT, 15 denotes a horizontal synchronizing signal input terminal, $\Delta\phi$ (16) denotes a phase detector, 17 denotes a voltage-controlled oscillator in which the oscillation frequency is selected at about three times ($3f_S$) of the sampling frequency of the input video signal. Reference numeral 18 denotes a counter which generates clock signals of various frequencies (inclusive of at least, horizontal scanning frequencies $f_H$, $3f_H$, $f_S$, and $3f_S$). In other words, 16, 17 and 18 form a phase-locked loop (PLL). Reference numeral 19 denotes a horizontal deflection circuit, in which the horizontal deflection frequency is three times the input horizontal scanning frequency. Reference numeral 20 denotes a vertical synchronizing signal input terminal, and 21 denotes a vertical deflection circuit.

Figure 6:
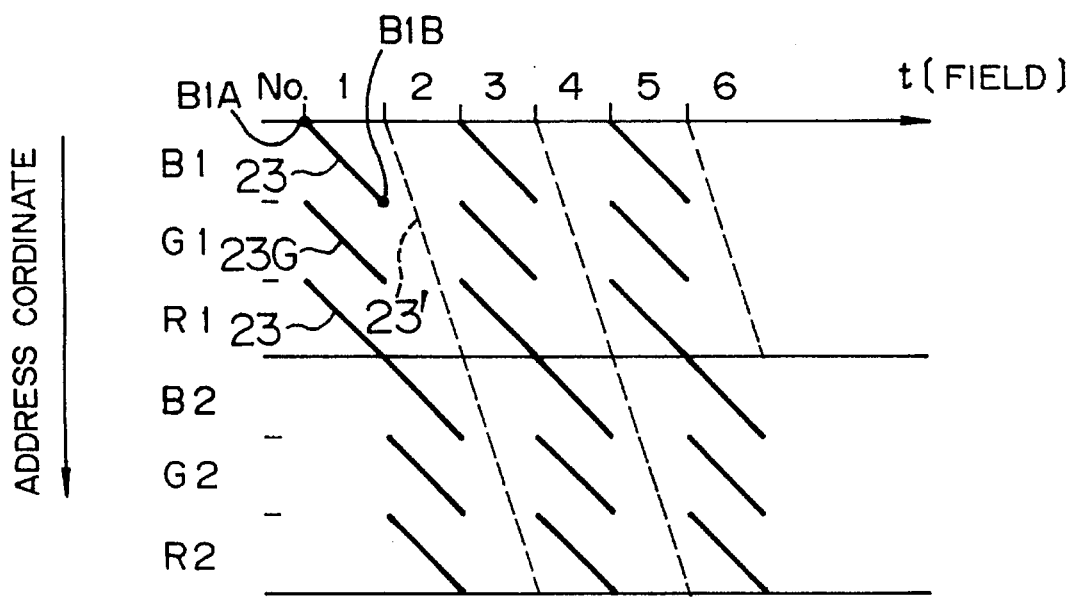
FIG. 6 is a diagram for explaining the operation of the parallel-to-serial scan-conversion means in an embodiment of the present invention.

FIG. 6 shows the operation principle and the operation of the parallel-to-serial scan-conversion means. In FIG. 6, the axis of abscissas represents time (t) expressed by the field numbers. The axis of ordinates represents the address coordinates of two sets of memory elements R1, G1, B1, and R2, G2, B2. The slant solid lines 23 show the loci of timing of writing on the memory elements, while the slant dotted lines 23' show the loci of timing of reading from the memory elements. For example, the slant solid line 23G shows that a green image signal of the first field is written into the memory G1 at time of the first field, and the slant dotted line 23' shows that the blue, green and red image signals of the first field are read field-sequentially at time of the second field. In FIG. 2, invertical deflection of the electron beam, when the phosphor plate is scanned from bottom to top, the screen is scanned from top to bottom. In this example in FIG. 6, the gradient of the slant dotted lines is three times steeper than that of the solid lines, so that the horizontal scanning frequency of the output signal is three times greater than that of the input signal.

In FIG. 6, B1A and B1B denote the start and end points of a blue image to be written into the first memory element. Similarly, there are the start and end points for the red and green images.

In FIG. 5, when the input image signal is field-sequentially arranged, the need for the parallel-to-serial scan-conversion means can be obviated.

FIG. 6 shows the case where the output field frequency $f_V$ is the same as the frequency of the input signal. It is possible as an alternative plan to make a modification that the reading rate is made more than twice faster to reduce the interline flicker.

Figure 10:
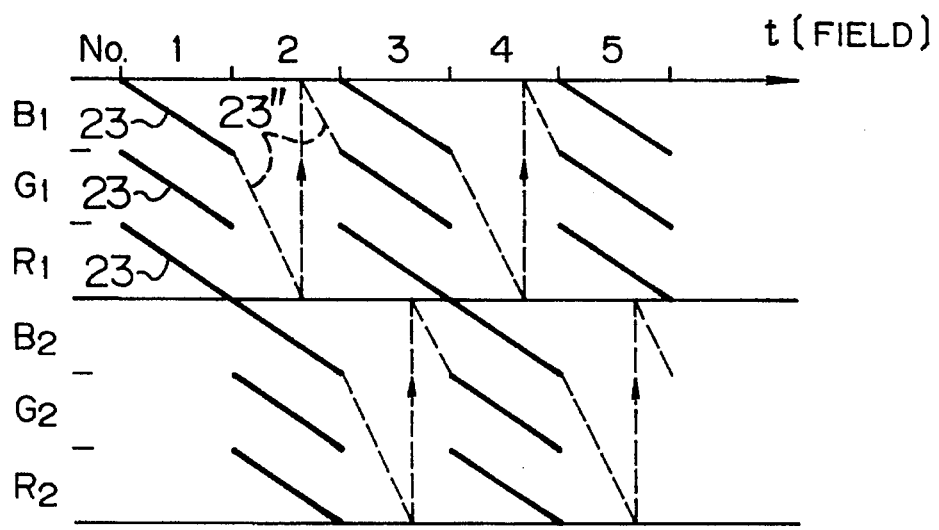
FIG. 10 is a diagram for explaining the operation in the embodiment of FIG. 9 of a parallel-to-serial scan-conversion means.

The duration of afterglow differs among the phosphors of the three colors, red, green and blue, and errors resulting from the differences of the duration need to be reduced. FIG. 10 shows an embodiment to reduce the above-mentioned errors. The duration of afterglow is about 8 ms, 1.6 ms and 4 µs for the green, red and blue phosphors. By displaying the video information of each field in the order of green, red and blue (in a descending order from a beam with a long afterglow duration to a beam with a short afterglow duration), the substantial emission timing error can be minimized.

In FIG. 10, the slant solid lines 23 show the loci of timing of writing into the memory elements just as shown in FIG. 6. The slant dotted lines 23" shows that the red, green, and blue image signals are read in that order. The vertical scanning of the CRT is performed in synchronism with timing to read. This can be easily realized by making a modification of shifting the scanning phase of the vertical deflection circuit 21 by about ⅓ of its period. Therefore, the substantial differences in the emission timing can be reduced by scanning an image of a long afterglow duration (namely, green) beforehand and scanning an image of a short afterglow duration (namely, blue) afterwards.

Figure 7:
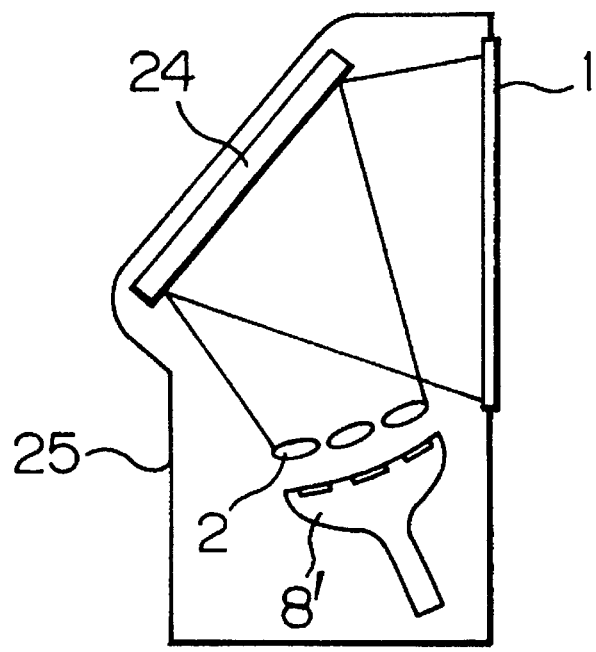
FIG. 7 is a schematic side view of the back projection display in which the present invention is applied.
Figure 8:
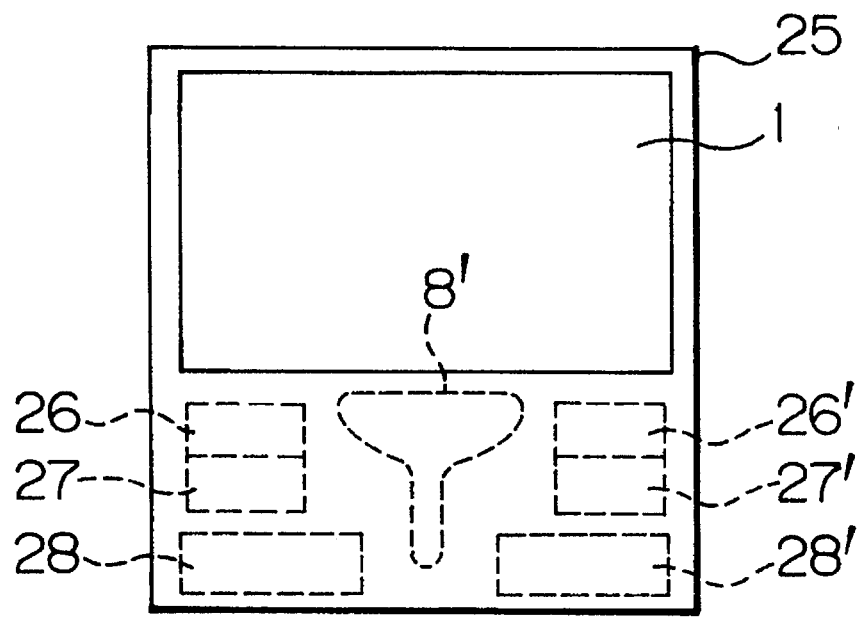
FIG. 8 is a schematic front view of the display shown in FIG. 7.

FIG. 7 is a side view of an embodiment in which the present invention is applied. In FIG. 7, reference numeral 24 denotes a reflecting mirror, and 25 denotes a cabinet. FIG. 8 is a front view of a rear projection display to which the present invention is applied.

In FIG. 8, reference numerals 26, 26" denote speaker spaces, and 27, 27' and 28, 28' denote shelves for CD player, VTR, discs, tapes, etc. To be more specific, the present invention offers an advantage of more effective use of the wide space on the left and right sides below the screen than in the conventional three-tube type horizontal projection display.

Figure 9:
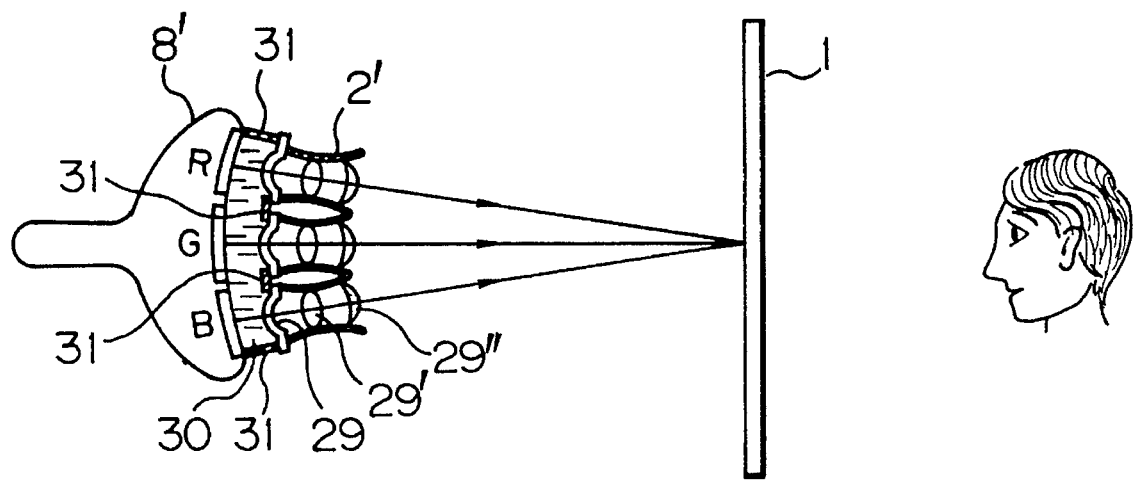
FIG. 9 is a schematic plan view showing another embodiment of the present invention.

FIG. 9 shows another embodiment of the present invention in a vertical section to show the integrated optical coupling structure described in (2) above. In FIG. 9, reference numerals 1, 8' denote the same parts as mentioned above. Reference numeral 2' denotes lens barrels, 29, 29' and 29" denote lens elements, 30 denotes a cooling liquid which is a silicone oil, ethylene glycol or glycerin alcohol, and 31 denotes a container, made of aluminum or plastic material, for containing the liquid. The boundary portions between container 31, the CRT means 8' and the lens elements 29 are sealed by O-rings or an adhesive to prevent the liquid from leaking out. According to the construction shown in FIG. 9, the expensive optical coupling structure, which used to be three separate units, can be formed in one unit.

According to the present invention, without using the shadow mask which incurs a great light loss, a projection color display can be formed by using a single CRT. Therefore, a projection display can be formed with a smaller number of parts without sacrificing the light utilization efficiency.

Since it is possible to reduce the crossing angle of the three primary colors, the present invention can provide a projection display with excellent picture quality with less color shift.

When the present invention is applied to the rear projection display, disk shelves can be installed in the left and right spaces below the screen, which contributes to space-saving.

What is claimed is:

1. A single-tube type projection display comprising:

a screen;

three projection lenses;

a parallel-to-serial scan-conversion means; and a vertically-arranged three-primary-color phosphor CRT, wherein said CRT has phosphor layers for three primary colors formed on upper, middle and lower portions of a faceplate thereof, the middle portion of the faceplate corresponding to a green phosphor having a longest after-glow duration among the three primary colors, wherein images of the three primary colors are projected field-sequentially on said phosphor layers with one electron, a green color image being displayed prior to images of other of the three primary colors, and wherein by overlapping said images of the three primary colors on said screen by said three projection lenses, a color picture can be formed on said screen.

2. A single-tube type projection display according to claim 1, further comprising an electric circuit including said parallel-to-serial scan-conversion means.

3. A single-tube type projection display according to claim 1, wherein said phosphor faceplate of said CRT is formed with a radius of curvature one to two times a distance between said phosphor faceplate and said screen.

4. A single-tube type projection display according to claim 3, further comprising a reflecting mirror altering a projection light path, wherein at least one of spaces on the left-hand and right-hand sides below said screen includes a shelf.

5. A single-tube type projection display according to claim 1, wherein an output field-scanning frequency is faster than an input signal field-scanning frequency.

6. A single-tube type projection display according to claim 5, wherein the output field-scanning frequency is two times faster than the input signal field-scanning frequency.

7. A single-tube type projection display according to claim 1, further comprising a reflecting mirror altering a projection light path, wherein at least one of spaces on the left-hand and right-hand sides below said screen includes a shelf.

8. A single-tube type projection display according to claim 1, further comprising a reflecting mirror altering a projection light path.

9. A single-tube type projection display according to claim 3, further comprising a reflecting mirror altering a projection light path.

* * * * *

UNITED STATES PATENT AND TRADEMARK OFFICE
CERTIFICATE OF CORRECTION

PATENT NO.    :    5,592,238
DATED         :    January 7, 1997
INVENTOR(S)   :    Masanori OGINO et al.

It is certified that error appears in the above-identified patent and that said Letters Patent is hereby corrected as shown below:

| Column | Line | |
|--------|------|---|
| 1 | 21 | After "display" delete ",". |
| 5 | 9  | After "electron" insert --beam--. |

Signed and Sealed this

Tenth Day of June, 1997

Attest:

BRUCE LEHMAN

Attesting Officer

Commissioner of Patents and Trademarks